(12) United States Patent
Mukherji et al.

(10) Patent No.: US 10,542,517 B1
(45) Date of Patent: *Jan. 21, 2020

(54) CHARACTERIZING MOVEMENT BEHAVIORS OF WIRELESS NODES IN A NETWORK

(71) Applicant: Cisco Technology, Inc., San Jose, CA (US)

(72) Inventors: Abhishek Mukherji, Milpitas, CA (US); Santosh Ghanshyam Pandey, Fremont, CA (US); Abhishek Bhattacharyya, Fremont, CA (US); Vinay Raghuram, Cupertino, CA (US); Balaji Gurumurthy, Milpitas, CA (US); Prasad Walawalkar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,359

(22) Filed: Aug. 13, 2019

Related U.S. Application Data

(63) Continuation of application No. 16/250,043, filed on Jan. 17, 2019.

(51) Int. Cl.
*H04W 24/00* (2009.01)
*H04W 64/00* (2009.01)
(Continued)

(52) U.S. Cl.
CPC .......... *H04W 64/00* (2013.01); *H04L 41/145* (2013.01); *H04L 41/147* (2013.01); *H04W 4/029* (2018.02); *H04W 4/33* (2018.02)

(58) Field of Classification Search
CPC ....... H04W 64/00; H04W 4/33; H04W 4/029; H04W 4/02; H04W 8/005; H04L 41/145;
(Continued)

(56) References Cited

U.S. PATENT DOCUMENTS 7,293,088 B2 * 11/2007 Douglas ................ G01S 5/0252
455/404.2
7,499,718 B2 * 3/2009 Stephenson ........... H04W 24/00
455/423

(Continued)

OTHER PUBLICATIONS

Altintas, et al., "Improving RSS-Based Indoor Positioning Algorithm via K-Means Clustering", 17th European Wireless 2011—Sustainable Wireless Technologies, pp. 1-5, 2011, IEEE.

(Continued)

*Primary Examiner* — Mahendra R Patel
(74) *Attorney, Agent, or Firm* — Behmke Innovation Group LLC; James Behmke; Stephen D. LeBarron

(57) ABSTRACT

In one embodiment, a device receives location estimates for a wireless node in a network, each location estimate having an associated timestamp. The device applies hierarchical clustering to the received location estimates and their associated timestamps, to identify locations and points in time in which the wireless node was stationary. The device performs sequence modeling on the identified locations and points in time in which the wireless node was stationary, to form a sequence of locations and associated time periods in which the wireless node was stationary. The device associates the wireless node with a behavioral profile based on the sequence of locations and associated time periods in which the wireless node. The device generates, based in part on the behavioral profile for the wireless node, a predictive model that predicts a location of the wireless node at a particular point in time.

19 Claims, 15 Drawing Sheets

(51) Int. Cl.
  *H04L 12/24* (2006.01)
  *H04W 4/33* (2018.01)
  *H04W 4/029* (2018.01)

(58) Field of Classification Search
  CPC ....... H04L 41/147; H04L 12/26; H04L 43/10;
       H04L 67/12; H04L 67/10; H04L 29/06;
       G06F 17/30; G06F 16/35; G06N 5/04;
       G06N 20/00; G06N 7/005; G01S 5/0252;
       G01S 5/0263
  USPC .......................................... 455/456.1; 370/328
  See application file for complete search history.

(56) References Cited

U.S. PATENT DOCUMENTS

| | | | | |
|---|---|---|---|---|
| 7,616,555 | B2* | 11/2009 | Hart ..................... | H04W 64/00 342/350 |
| 8,200,242 | B2* | 6/2012 | Dietrich ................ | H04W 64/00 455/456.1 |
| 8,335,173 | B2* | 12/2012 | Hart ..................... | G01S 5/0226 370/310 |
| 8,982,785 | B2 | 3/2015 | Pandey ................. | H04W 8/005 370/328 |
| 9,372,922 | B2 | 6/2016 | Shaashua et al. | |
| 9,485,267 | B2 | 11/2016 | Baxley et al. | |
| 9,551,775 | B2* | 1/2017 | Rangarajan ............. | G01S 1/08 |
| 9,606,219 | B2* | 3/2017 | Murdock .............. | G01S 5/0289 |
| 9,635,044 | B2 | 4/2017 | Baxley et al. | |
| 9,642,167 | B1* | 5/2017 | Snyder .................. | H04W 4/021 |
| 9,648,615 | B2* | 5/2017 | Joshi ................ | H04W 72/0446 |
| 9,712,485 | B2* | 7/2017 | Droms ................ | H04L 61/1511 |
| 9,736,175 | B2 | 8/2017 | Baxley et al. | |
| 9,749,786 | B1* | 8/2017 | Pandey ................. | H04B 17/318 |
| 2004/0266457 | A1* | 12/2004 | Dupray ................. | G01S 5/0268 455/456.5 |
| 2013/0317944 | A1* | 11/2013 | Huang .................. | G01S 5/0252 705/26.61 |
| 2014/0099970 | A1* | 4/2014 | Siomina ................. | G01S 19/49 455/456.1 |
| 2015/0237492 | A1 | 8/2015 | Huang .................. | H04W 40/18 455/41.2 |
| 2016/0277197 | A1* | 9/2016 | Jose ....................... | H04W 64/00 |
| 2016/0301707 | A1 | 10/2016 | Cheng et al. | |
| 2017/0279829 | A1* | 9/2017 | Vasseur ............... | H04L 41/0893 |

OTHER PUBLICATIONS

Cao, et al., "On human mobility predictability via WLAN logs", IEEE INFOCOM 2017—IEEE Conference on Computer Communications, pp. 1-9, 2017, IEEE.

Ester, et al., "A Density-Based Algorithm for Discovering Clusters in Large Spatial Databases with Noise", KDD-96 Proceedings, Spatial, Text, & Multimedia, pp. 226-231, 1996, AAAI.

Ferrando, et al., "Classification of Device Behaviour in Internet of Things Infrastructures: Towards Distinguishing the Abnormal From Security Threats", International Conference on Internet of Things and Machine Learning, Liverpool, 7 pages, Oct. 2017, Dublin Institute of Technology.

Fontugne, et al., "Strip, bind, and search: a method for identifying abnormal energy consumption in buildings", IPSN '13 Proceedings of the 12th international conference on Information processing in sensor networks, pp. 129-140, 2013, ACM.

Gueniche, et al., "Compact Prediction Tree: A Lossless Model for Accurate Sequence Prediction", ADMA 2013: Advance Data Mining and Applications, International Conference on Advanced Data Mining and Applications, Lecture Notes in Computer Science, vol. 8347, pp. 177-188, Springer, Berling, Heidelberg.

Lee, et al., "A novel clustering-based approach of indoor location fingerprinting", 2013 IEEE 24th Annual International Symposium on Personal, Indoor, and Mobile Radio Communications (PIMRC), pp. 3191-3196, 2013, IEEE.

Schauer, et al., "Clustering of Inertial Indoor Positioning Data", 1st KuVS Expert Talk on Localization, pp. 21-23, 2015.

Shang, et al., "APFiLoc: An Infrastructure-Free Indoor Localization Method Fusing Smartphone Inertial Sensors, Landmarks and Map Information", Sensors 2015, 15, pp. 27251-27272, 2015, MDPI.

Sheng, et al., "Detecting 802.11 MAC Layer Spoofing Using Received Signal Strength", IEEE INFOCOM 2008—The 27th Conference on Computer Communications, pp. 1768-1776, 2008, IEEE.

Xu, et al., "Exploiting human mobility trajectory information in indoor device-free passive tracking", IPSN '12 Proceedings of the 11th international conference on Information Processing in Sensor Networks, pp. 121-122, ACM, Apr. 2012.

Zheng, et al., "Accurate rogue access point localization leveraging fine-grained channel information", 2014 IEEE Conference on Communications and Network Security, pp. 211-219, 2014, IEEE.

* cited by examiner

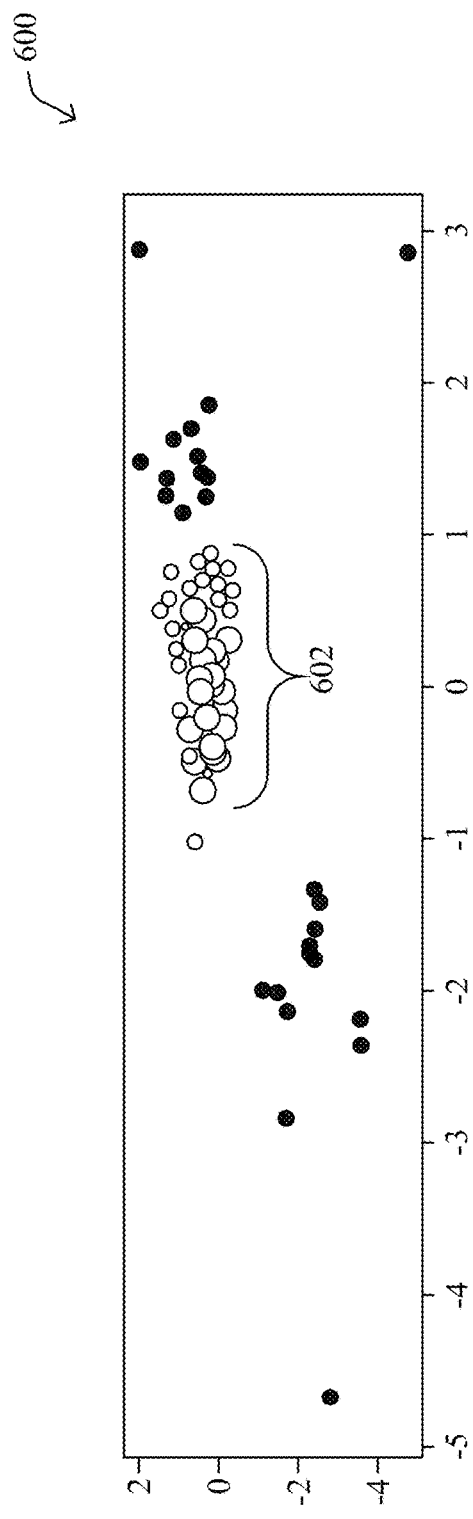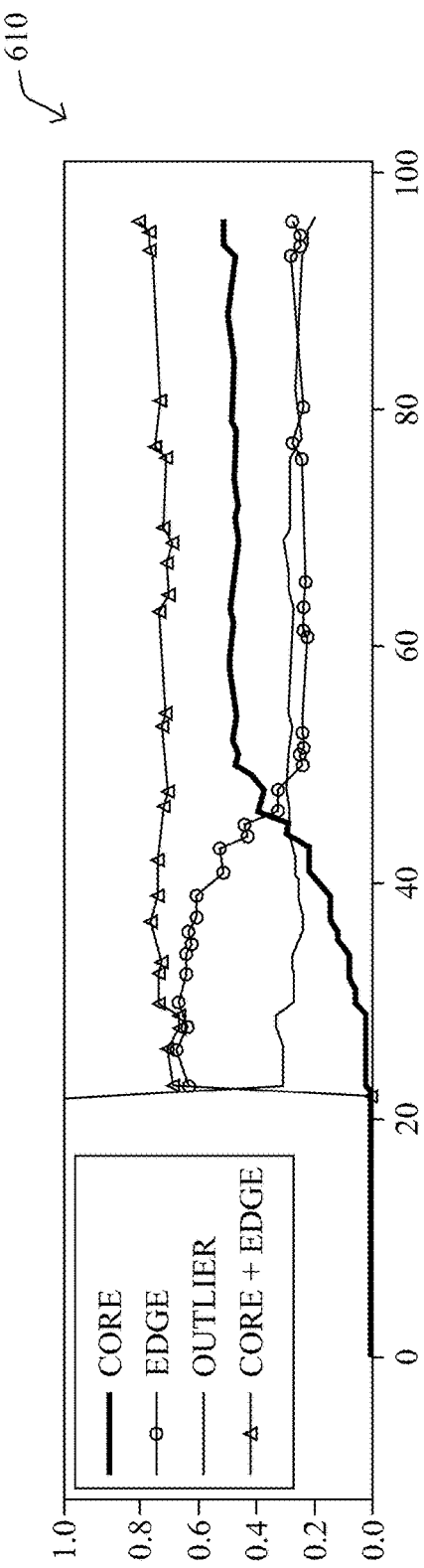
FIG. 6A
FIG. 6B

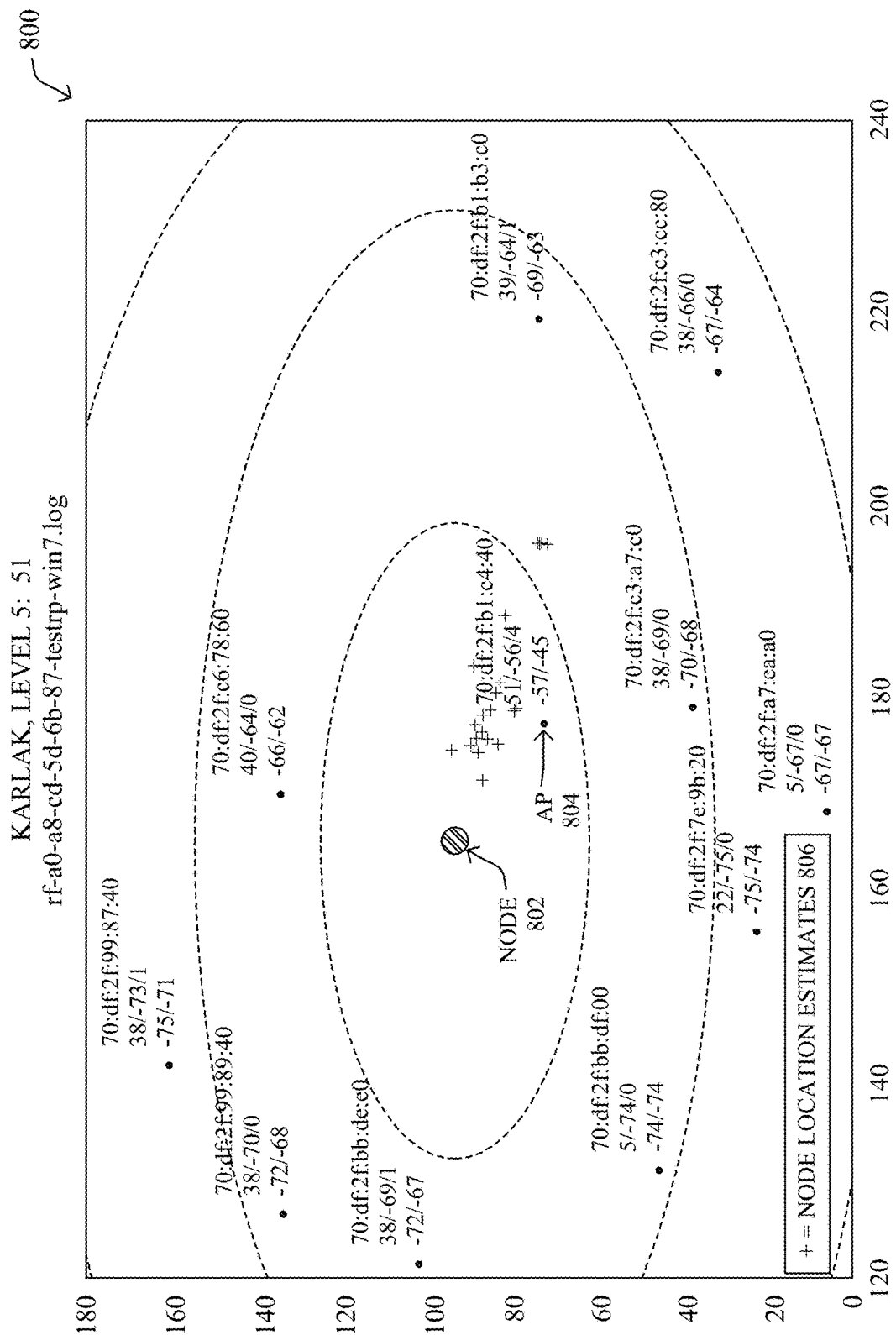

CHARACTERIZING MOVEMENT BEHAVIORS OF WIRELESS NODES IN A NETWORK

RELATED APPLICATION

This application is a continuation of U.S. patent application Ser. No. 16/250,043, filed Jan. 17, 2019, entitled CHARACTERIZING MOVEMENT BEHAVIORS OF WIRELESS NODES IN A NETWORK, by Abhishek Mukherji, et al., the contents of which are incorporated herein by reference.

TECHNICAL FIELD

The present disclosure relates generally to computer networks, and, more particularly, to characterizing movement behaviors of wireless nodes in a network.

BACKGROUND

Wireless networks are becoming increasingly ubiquitous, with many businesses, schools, and public areas now offering wireless connectivity to authorized users and to guests. With the increasing popularity of wireless networks, the number of different types of wireless nodes is also rapidly increasing. For example, personal devices now include cellular phones, tablets, wearable devices (e.g., smart watches, head-mounted displays, etc.), and the like, of various makes, models, and configurations. In addition, tracking tags are also becoming much more common, allowing the wireless network to track the objects to which the tags are attached.

In general, an infrastructure-based indoor positioning system (IPS) processes the radio frequency (RF) signals received at the access points (APs) in the wireless network, to estimate the locations of the various wireless nodes in the network. While an IPS may compute the location of a node, every time the node is heard by the APs and IPS receives the data, many wireless nodes often exhibit distinctive behavioral patterns. For example, the employees in a workplace may arrive and depart at certain times during the week, mostly stay in their designated seats, and occasionally go to meeting rooms, the bathroom, or break rooms. Similarly, in a medical facility, two different tracking tags attached to different assets may exhibit very different patterns, such as one being attached to an ECG machine in a fixed location and the other being attached to an intravenous (IV) pump on a mobile stretcher.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6F illustrate example cluster features for different wireless node behaviors;

FIGS. 8A-8B illustrate examples of RF footprints of different devices at the same location.

DESCRIPTION OF EXAMPLE EMBODIMENTS

Overview

Figure 1A:
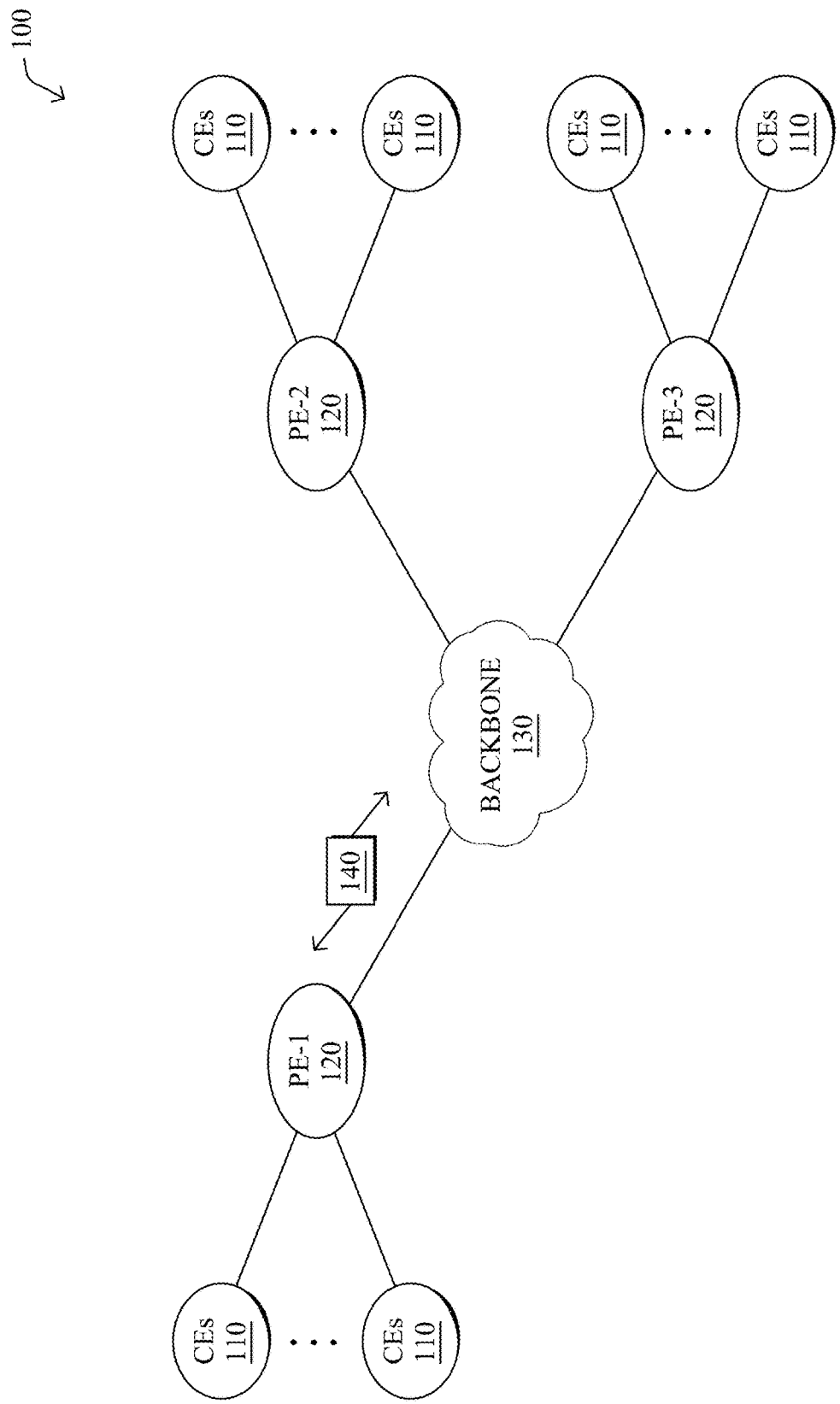
FIGS. 1A-1B illustrate an example communication network.

According to one or more embodiments of the disclosure, a device receives location estimates for a wireless node in a network, each location estimate having an associated timestamp. The device applies hierarchical clustering to the received location estimates and their associated timestamps, to identify locations and points in time in which the wireless node was stationary. The device performs sequence modeling on the identified locations and points in time in which the wireless node was stationary, to form a sequence of locations and associated time periods in which the wireless node was stationary. The device associates the wireless node with a behavioral profile based on the sequence of locations and associated time periods in which the wireless node. The device generates, based in part on the behavioral profile for the wireless node, a predictive model that predicts a location of the wireless node at a particular point in time.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, is each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in is network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
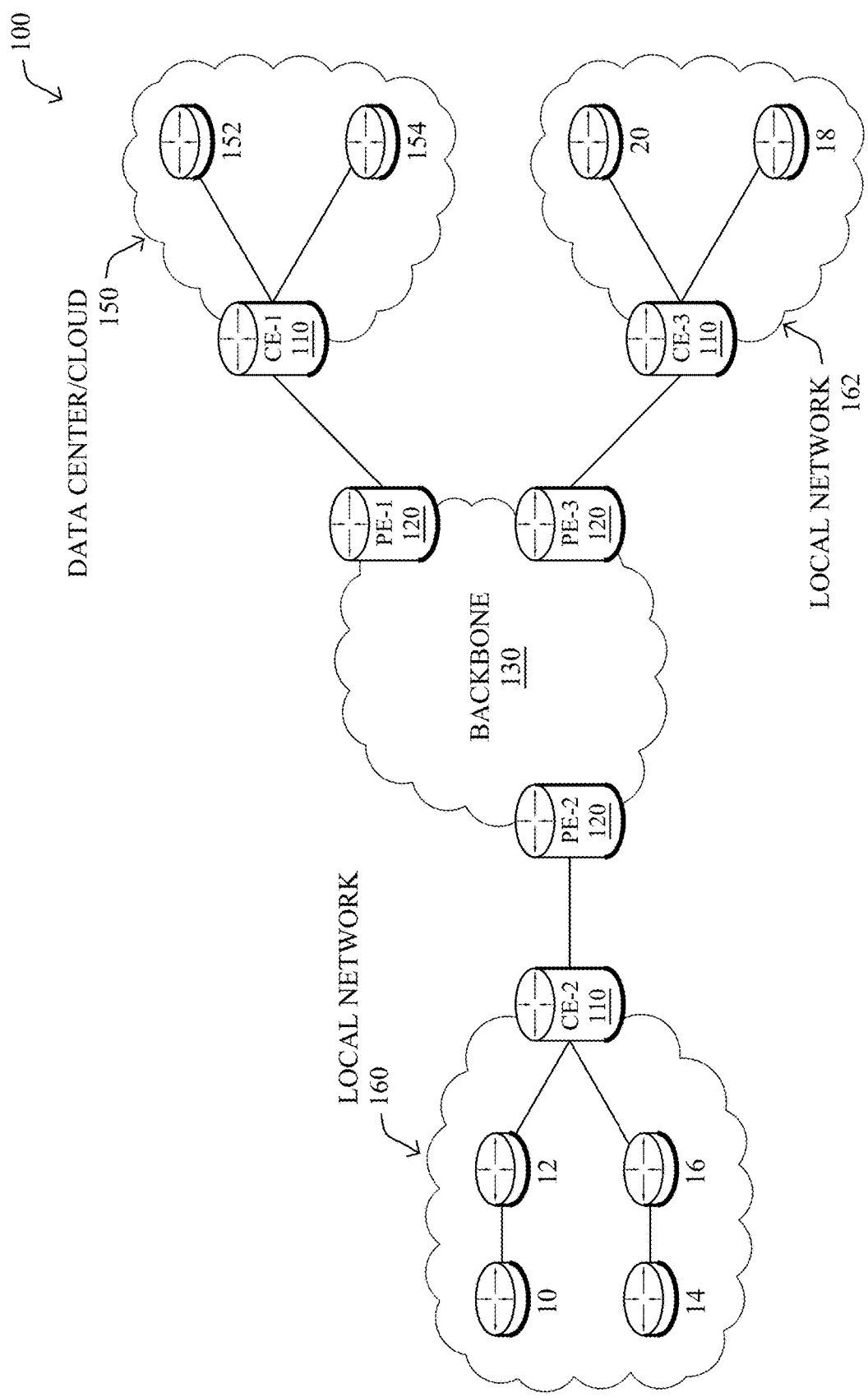

FIG. 1B illustrates an example of network 100 in greater detail, according to various embodiments. As shown, network backbone 130 may provide connectivity between devices located in different geographical areas and/or different types of local is networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
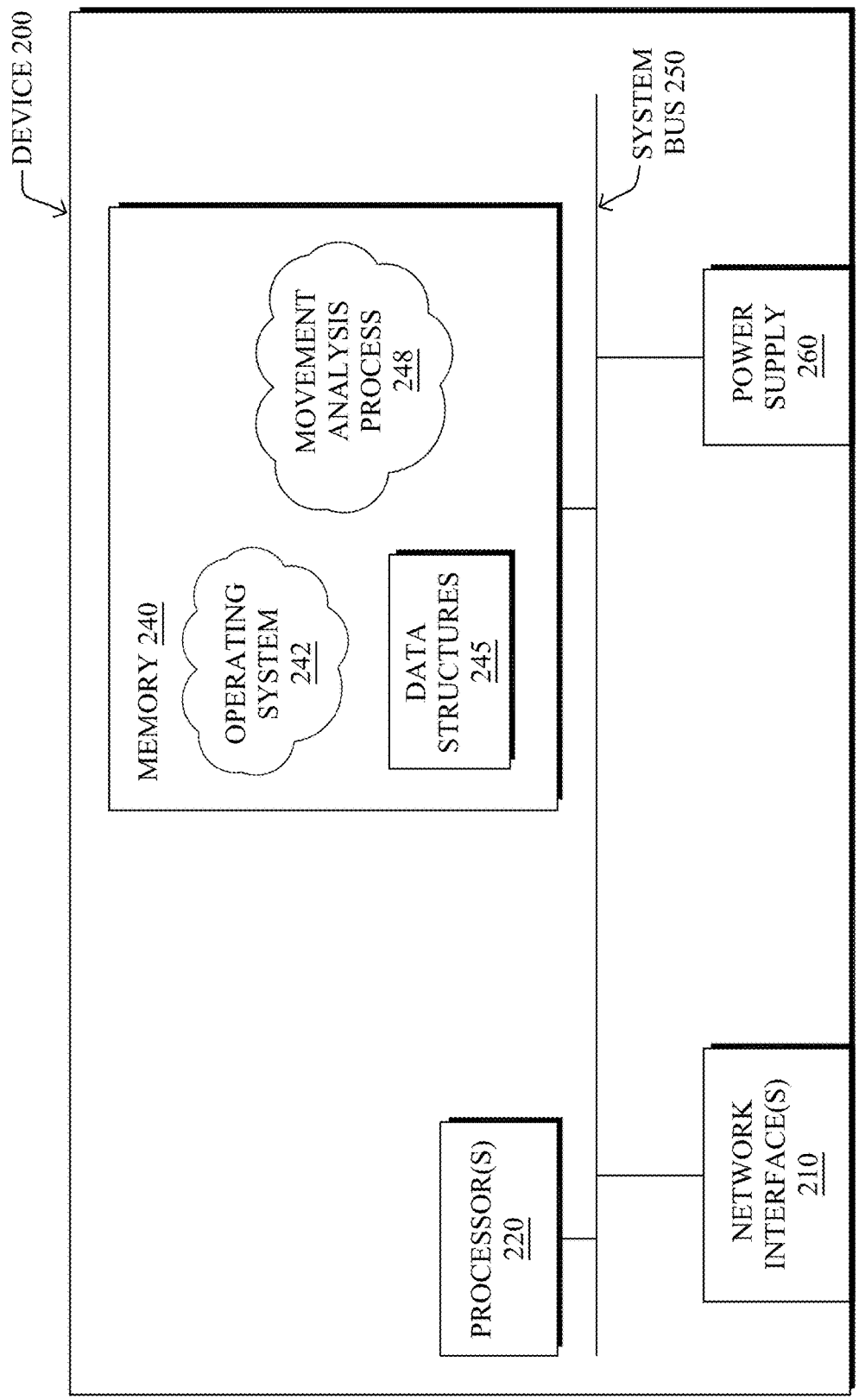
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, is as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative movement analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, movement analysis process 248 may utilize machine learning techniques, to monitor, analyze, and predict the locations of wireless nodes in a network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of monitoring, analyzing, and predicting movement behavior in a wireless network, a learning machine may construct a model of the observed behavior of a given wireless. Example machine learning techniques that may be used to construct such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of monitoring, analyzing, and predicting node behavior in a wireless network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of similarity (e.g., using a Euclidian distance and a cluster based local outlier factor that takes into account the cluster density). More specifically, in some embodiments, behavioral data for clients of the same type can be clustered and used to train a behavioral model for that type of client.

Replicator techniques may also be used for purposes of monitoring, analyzing, and predicting node behavior in a wireless network. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
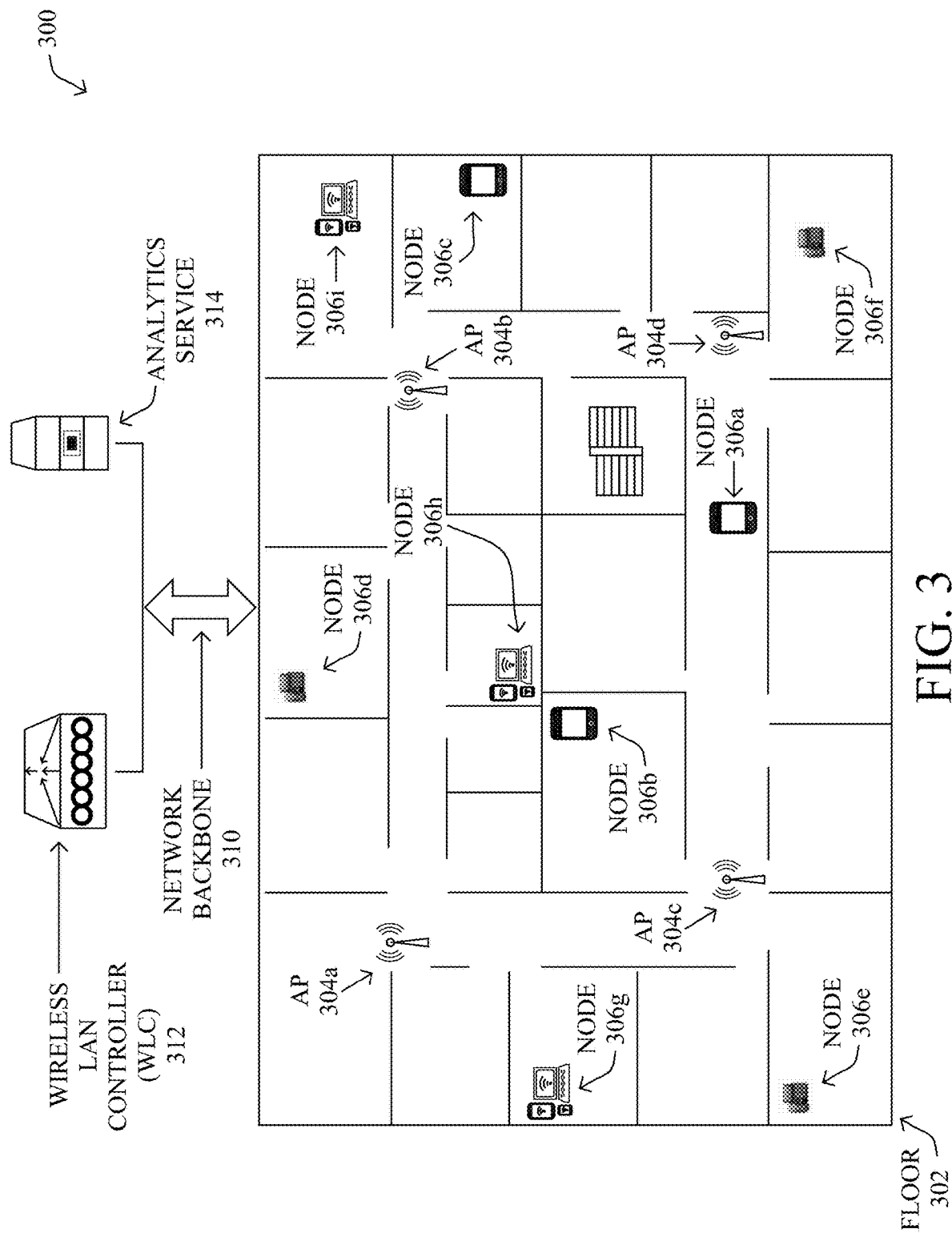
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless nodes 306 distributed throughout the location. For illustrative purposes, APs 304a-304d and clients 306a-306i are depicted in FIG. 3. However, as would be appreciated, a wireless network deployment may include any number of APs and wireless nodes.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max is number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.).

In various embodiments, monitoring and analytics service 314 may also include an indoor positioning system (IPS) configured to compute location estimates for the various wireless nodes 306 within wireless network 300. For example, the location of a given wireless node 306 can be estimated via analysis of the received signal strength indicator (RSSI) information, angle of arrival (AoA), information, and/or other RF data regarding the node 306 collected by one or more of APs 304.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of nodes 304 in network 300 can vary greatly. For example, nodes 306a-306c may be mobile phones, nodes 306d-306f may be office phones, and nodes 306g-306i may be computers, all of which may be of different makes, models, and/or configurations (e.g., firmware or software versions, chipsets, etc.). Other forms of wireless nodes in a network may also include radio frequency (RF) tracking tags. Consequently, each of nodes 306a-306i may behave very differently in wireless network 300 from both RF and traffic perspectives.

As noted above, each individual node 306 may exhibit a unique behavior, from an RF standpoint (e.g., chirp rates, connection, radio sleep patterns, etc.), as well as from a movement pattern standpoint. This insight gives way to the possibility of using machine learning to model the behaviors of the nodes. Then, the learned patterns can be leveraged for several use cases such as the following:

Apply behavior-driven policies to nodes: With potentially thousands of nodes in a given wireless network deployment, understanding node and node-category behaviors will enable the network to apply behavior-based policies to the nodes. For example, assume that a number of tracking tags are attached to wheelchairs in a hospital that typically move between an operating theater (OT) and an intensive care unit (ICU). Meanwhile, the tags attached to wheelchairs on the radiology level of the hospital may be much more stationary over a long period of time. Based on this, the network could flag the wheelchairs on the radiology level as underutilized, based on their comparatively stationary profiles.

Detect anomalous node behavior: Once the movement profile of a node has been modeled, the network can use this model to identify anomalous movements of the node. For example, media access control (MAC) address spoofing is one approach taken by malicious actors to harm or attack a network. While this is relatively easy to do in many networks, it is much more difficult to spoof the movement profile of a node. Thus, the movement patterns can be used by the network to detect anomalies and raise alerts and/or take remediation actions, when the movement of a node becomes anomalous. In addition, nodes with similar profiles can be grouped together to build a richer profile, making it easier to identify abnormally behaving nodes whose behaviors differ significantly from that of the rest of the group.

Opportunistic sensing: If a certain wireless node is predicted to be static during a particular time period, the IPS use an indication of this prediction to delay re-computing the location estimate of the node during that time period. Notably, many IDSs may re-compute the location estimate of a node every time it hears from that node. In some embodiments, if the node is expected to remain stationary for some time, the IDS can instead skip some or all of these computations, thereby freeing computational resources for other uses.

Stabilize and improve location accuracy: While every location estimation by an IPS is typically performed using instantaneous RF signal data, once a node is known to be stationary, the IPS can instead use aggregated inputs to make the location estimations. Similarly, if a node is found to be moving, the IPS can also take into account physical constraints on the map along the path of travel (e.g., walls, furniture, staircases, elevators, etc.) and apply moving filters or smoothing during the estimations.

Characterizing Movement Behaviors of Wireless Nodes in a Network

The techniques introduced herein apply a combination of machine learning-based clustering and sequence prediction, to evaluate the static nature of wireless nodes in a network. In some aspects, the techniques herein can be used to construct node-specific profiles, to learn how a node uses resources in a building, for purposes of anomaly detection, and the like. In further aspects, the techniques herein can also be used to generate category-based profiles that group nodes with similar profiles, to build a richer profile. This will help to bootstrap behavior-driven policies for new nodes and make it easier to identify nodes that are behaving abnormally by observing that their behavior is different from the rest of their category.

Specifically, according to one or more embodiments of the disclosure as described in detail below, a device receives location estimates for a wireless node in a network, each location estimate having an associated timestamp. The device applies hierarchical clustering to the received location estimates and their associated timestamps, to identify locations and points in time in which the wireless node was stationary. The device performs sequence modeling on the identified locations and points in time in which the wireless node was stationary, to form a sequence of locations and associated time periods in which the wireless node was stationary. The device associates the wireless node with a behavioral profile based on the sequence of locations and associated time periods in is which the wireless node. The device generates, based in part on the behavioral profile for the wireless node, a predictive model that predicts a location of the wireless node at a particular point in time.

Illustratively, the techniques described herein may be performed by hardware, software, and/or firmware, such as in accordance with the movement analysis process 248, which may include computer executable instructions executed by the processor 220 (or independent processor of interfaces 210) to perform functions relating to the techniques described herein.

Figure 4:
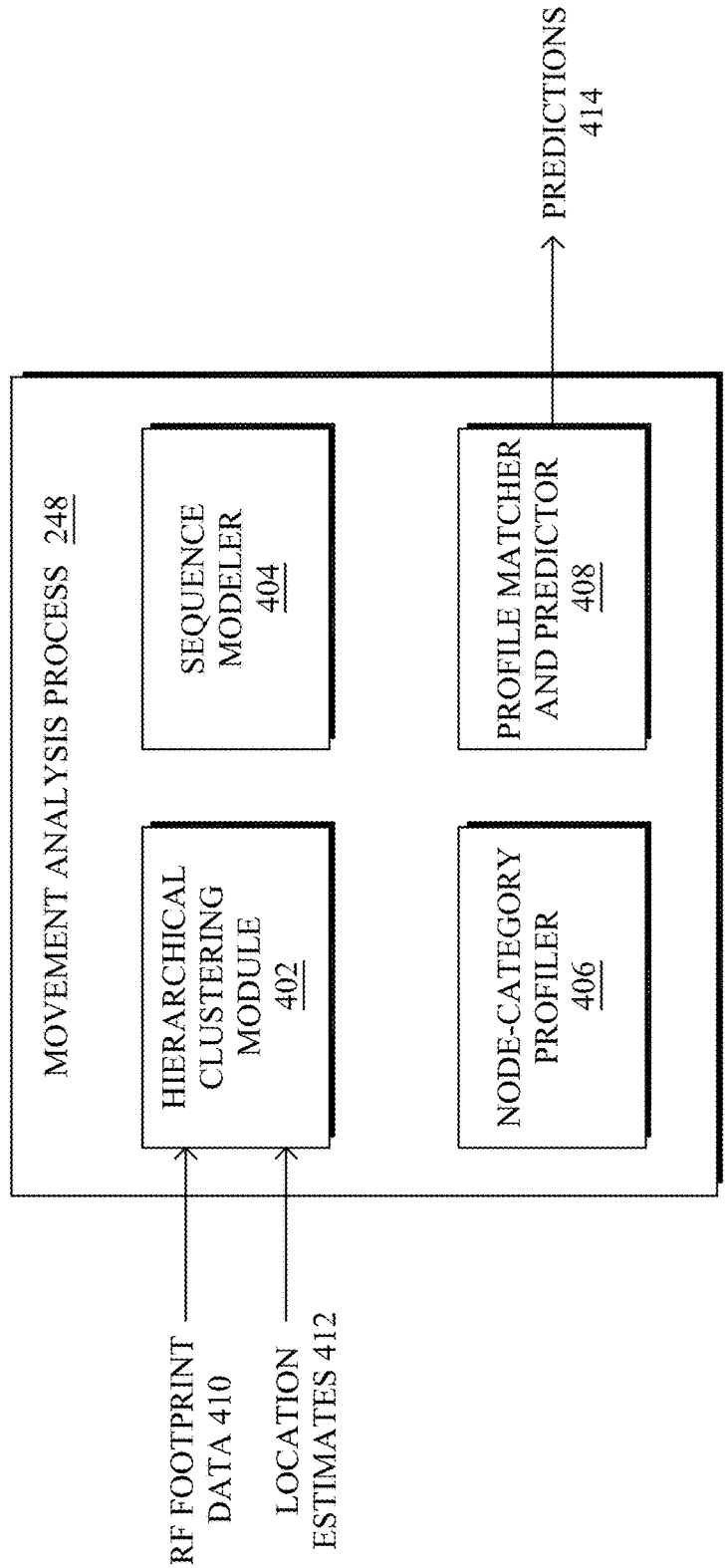
FIG. 4 illustrates an example architecture for characterizing movement behaviors is of wireless nodes in a network.

Operationally, FIG. 4 illustrates an example architecture 400 for characterizing movement behaviors of wireless nodes in a network, according to various embodiments. As shown, movement analysis process 248 may include various components/sub-processes 402-408, to assess and model the movement-related behaviors of nodes in a wireless network. As would be appreciated, the components of architecture 400 may be implemented in a distributed manner across any number of devices or, alternatively, by a single analysis device. In addition, the functionalities of the components 402-408 of architecture 400 may be combined, omitted, or implemented as part of other processes, as desired. For example, the movement analysis service provided via execution of movement analysis process 248 may be implemented as part of an IPS or act in conjunction therewith. In a further example, the service can be implemented as a cloud-based service that communicates with any number of monitored wireless networks.

As shown, movement analysis process 248 may leverage either or both of the following inputs from the wireless network:
1) RF Footprint Data 410—In general, the RF footprint of a wireless node refers to its hourly, daily, weekly, etc. pattern of when the node is heard on the wireless network, how often it chirps, how it connects, how much traffic the node usually generates, the sleep patterns of the node when inactive, RF signals (e.g., RSSI and/or AoA), transmit power, combinations thereof, or the like.
2) Location Estimates 412—In general, this input data may be indicative of the location footprints of a wireless node. For example, such estimates may be made by an IPS and indicate the locations/rooms in which the node spends most of its time, the entrances or egresses used by the node, etc.

In various embodiments, security process 248 may include a hierarchical clustering module 402 that applies unsupervised hierarchical clustering to the location estimates 412 and/or RF footprint data 410, to distinguish static vs. moving wireless nodes in the network. As detailed below, module 402 uses this information to learn clustering parameters such as the radius (Eps) and number of points (count) for the various wireless nodes in the network.

The hierarchical clustering by hierarchical clustering module 402 has two aspects. In general, the hierarchy is defined by how strict the clustering parameters (radius and count) are. Experimentation has shown that very strict or high values will be reached only by static nodes, particularly those that are perpetually static. Thus, hierarchical clustering module 402 may utilize a first parameter threshold to identify those nodes that are static at any given point in time. Depending on deployment type (e.g., airport, hospital, office building, etc.), static nodes, such as tags (e.g., attached to refrigerator or microwave), constitute about 1-5% of all wireless nodes in a network. The second, less strict, parameter level that hierarchical clustering module 402 may employ is for moving nodes with occasional static behavior. The vast majority of wireless nodes in a given deployment typically fall within this category, accounting for 80-95% of all wireless nodes. Hierarchical clustering module 402 may employ a less strict parameter threshold (e.g., based on the radius and/or count), to identify such nodes on a per-node and/or per-node-category basis. Always moving devices usually account for less than 1% of the nodes in a given wireless network deployment, if at all. Given the rarity of such nodes, the techniques herein do not focus on these types of nodes.

More specifically, many IoT devices/nodes, especially tags, are equipped with only a very limited range of sensors. In order to localize such nodes without the aid of is any on-board sensors, the wireless network may use an IPS to compute location estimates 412 (e.g., x,y-coordinates within a building, etc.), based on the RSSI of chirping nodes, as measured by the APs in the wireless network. In some cases, the source IPS may also associate location estimates 412 with zones that discretize the floor map of the building and, depending on the use case, can be named. For example, zones in a department store might be called "shoes," "jewelry," or "clearance." Similarly, in a hospital, zones might be called "emergency," "pediatrics," or "radiology." Even without knowing the precise Cartesian coordinates of node, knowing which zones a device has spent time in provides invaluable contextual information about the movement behavior of the node.

Currently, RSSI-based location estimates by a modern IPS are accurate only to within 10 m, making it challenging to differentiate between stationary and moving nodes. Further, it is often difficult to determine which zone a stationary node is occupying, as consecutive location estimates can fluctuate between the node being inside and outside of that zone.

In various embodiments, hierarchical clustering module 402 may identify stationary positions/locations of a wireless node by applying machine learning-based clustering, such as DBSCAN clustering, to location estimates 412 of a wireless node. To better illustrate this approach, the following terminology is used herein:
Directly reachable—A point q is directly reachable from a point p if it is at most a distance of e units from p.
Reachable—A point q is reachable from a point p if there exists a sequence of points $p_0, p_1, \ldots, p_n$ such that $p_0$ is directly reachable from p, q is directly reachable from $p_n$, and each $p_k$ is directly reachable from $p_{k-1}$, for all k in $\{1, \ldots, n\}$.
Core point—A point p is a core point if there are at least m points directly reachable from p.
Edge point—A point q is an edge point if it is reachable from some core point p.
Cluster—A set of core and edge points that are all mutually reachable.

Outlier—A point s is an outlier if it is neither a core point nor an edge point (i.e., if the point is not in a cluster).

Parameters e, m—These are hyperparameters, whose values are user-defined.

Figure 5:
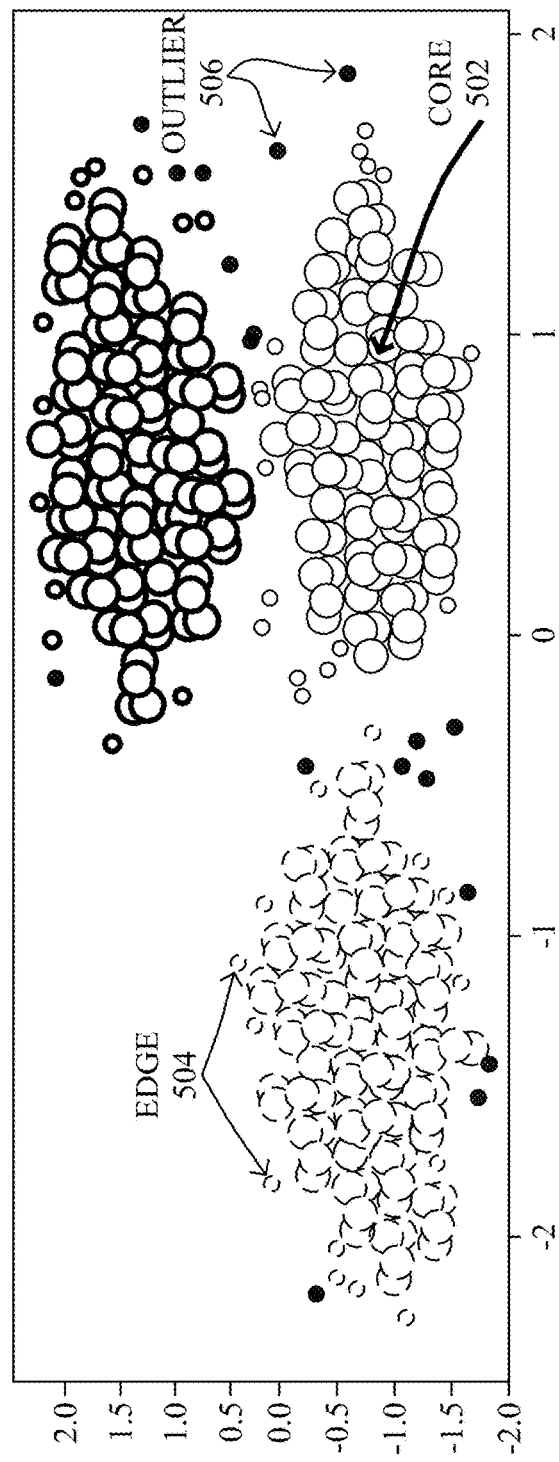
FIG. 5 illustrates an example of clusters for a wireless node.

An example of the above cluster features is illustrated in FIG. 5. As shown, application of the clustering process to the data points 500 results in three distinct clusters. Each such cluster has any number of core points 502 and any number of edge points 504 that help to define the cluster. In addition, there may be any number of outliers 506 that do not belong to any cluster and are neither core points 502 nor edge points 504.

Figure 6C:
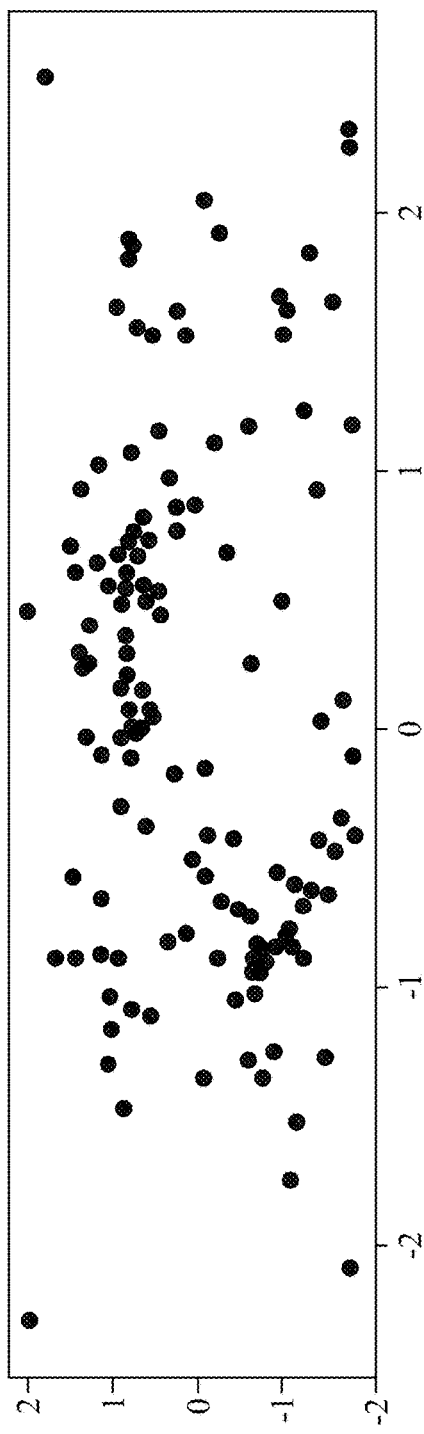
Figure 6D:
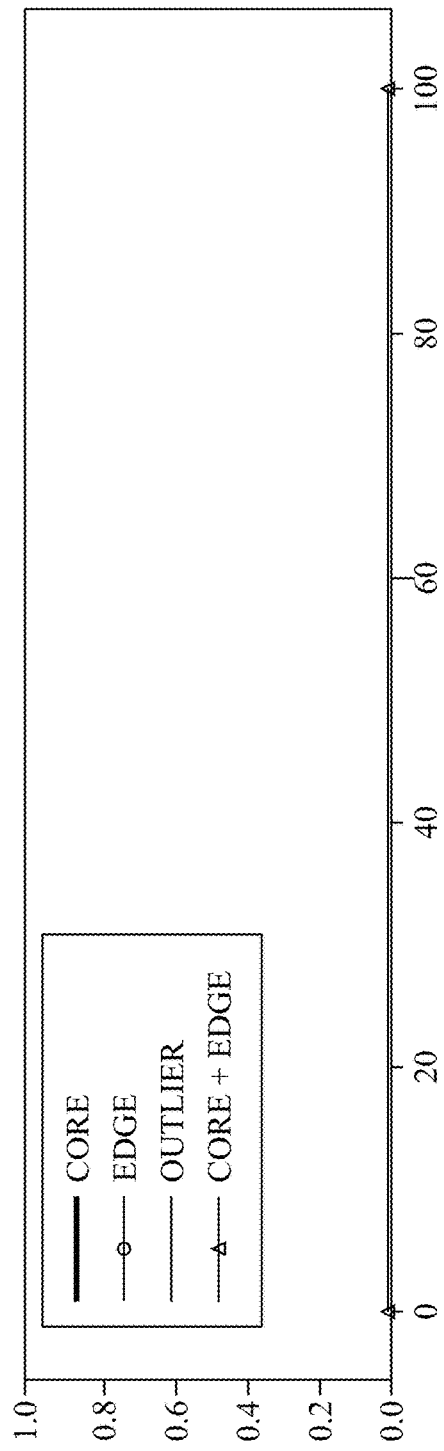

Using the above cluster features, a number of observations can be made regarding the behaviors of different wireless nodes. FIGS. 6A-6F illustrate example cluster features for different wireless node behaviors, in various embodiments. In particular, FIG. 6A illustrates a plot 600 of clustered location estimates for a stationary/static wireless node. In this embodiment, a stationary position may correspond to a physical zone occupied by the wireless node while it is not moving. Likewise, the period of time in which the node remains in a stationary position is referred to herein as its stationary period. Each stationary period maps to a single stationary position, although multiple stationary periods could map to the same stationary position.

As shown in FIG. 6A, the vast majority of location estimates for the static node belong to the same cluster 602 in plot 600. FIG. 6B illustrates a plot 610 of the measured cluster features for plot 600 in FIG. 6A. Notably, plot 610 plots the fractions of total estimates over time for the core, edge, and outlier points shown in plot 600 in FIG. 6A. After a very short startup period, these values converge to relatively stable values, with the vast majority of location estimates belonging to cluster 602 and a much smaller fraction falling as outliers (~20%).

According to various embodiments, a key aspect of the techniques herein is that the core+edge ratio of a cluster can be used to determine how strong the cluster is and whether the wireless node qualifies as being "always static" (more strict criteria) or is "stationary for a time period" (less strict). Such a ratio can be used to compute an immediate confidence factor $C_i$ as follows:

$$n_{total} = n_{core} + n_{edge} + n_{outlier}$$

$$C_i = (n_{core} + n_{edge})/n_{total}$$

In other words, the immediate confidence factor may be calculated by summing the number of core and edge points by the total number of points.

In contrast to FIGS. 6A-6B, FIGS. 6C-6D illustrate plots 620-630 of the clustered location estimates of a moving node and their corresponding cluster features, respectively. As shown in plot 620 in FIG. 6C, the location estimates for the moving node do not form any clusters. Accordingly, in plot 630 in FIG. 6D, the cluster features may be effectively non-existent, as there are no clusters for the moving node. Thus, the cluster features for a given wireless node can also be used to identify nodes that are always moving.

Figure 6E:
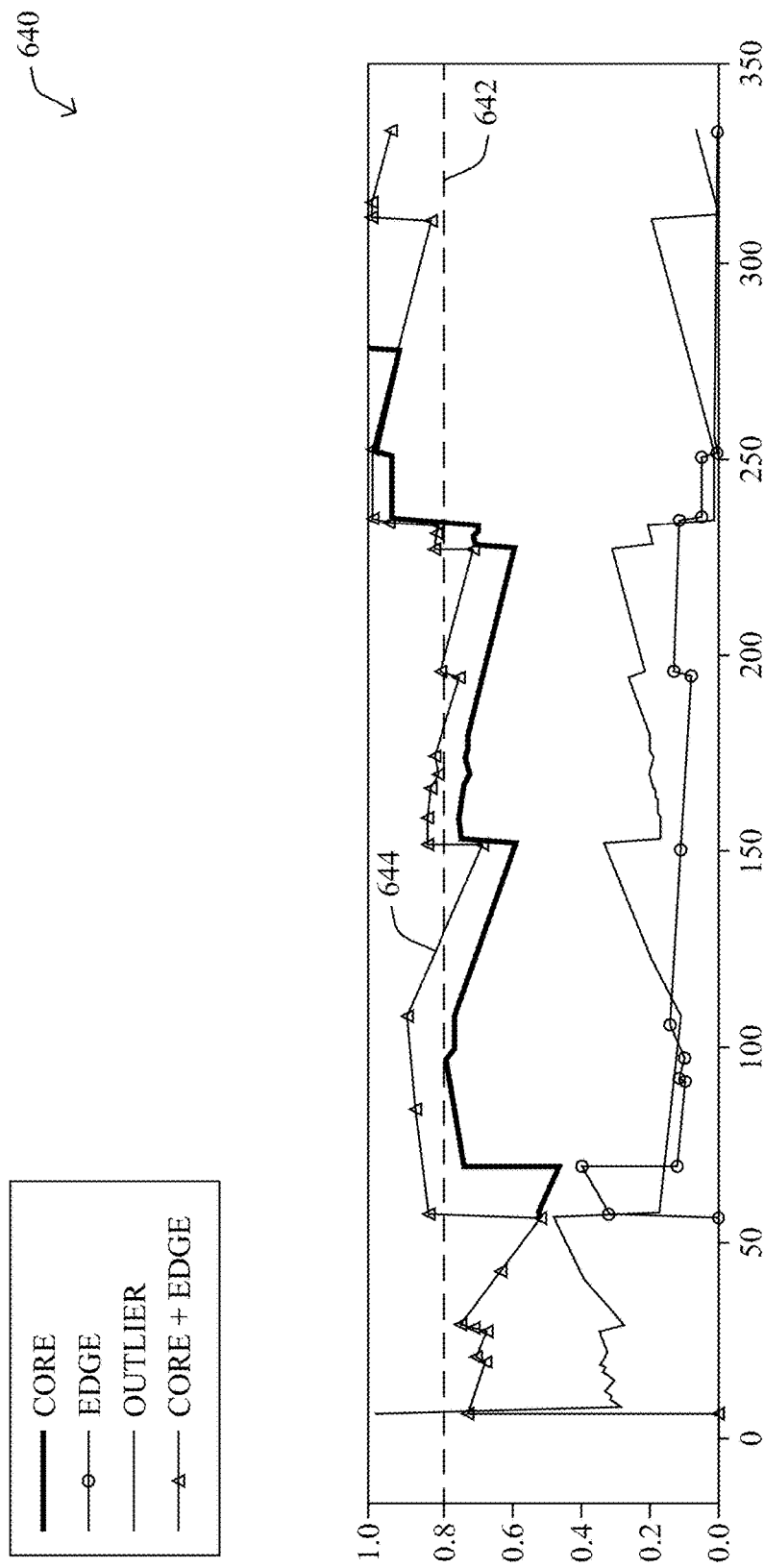

In various embodiments, as shown in FIG. 6E, the confidence factor/core+edge ratio of a node can be compared to a threshold, to identify points of time at which the node is stationary. Notably, in plot 640 of cluster features for a wireless node, the core+edge ratio can be compared to a threshold 642 that separates stationary/static node behavior from that of node movement. As shown, whenever the confidence factor 644 exceeds threshold 642, this may indicate that the node has stopped moving.

Figure 6F:
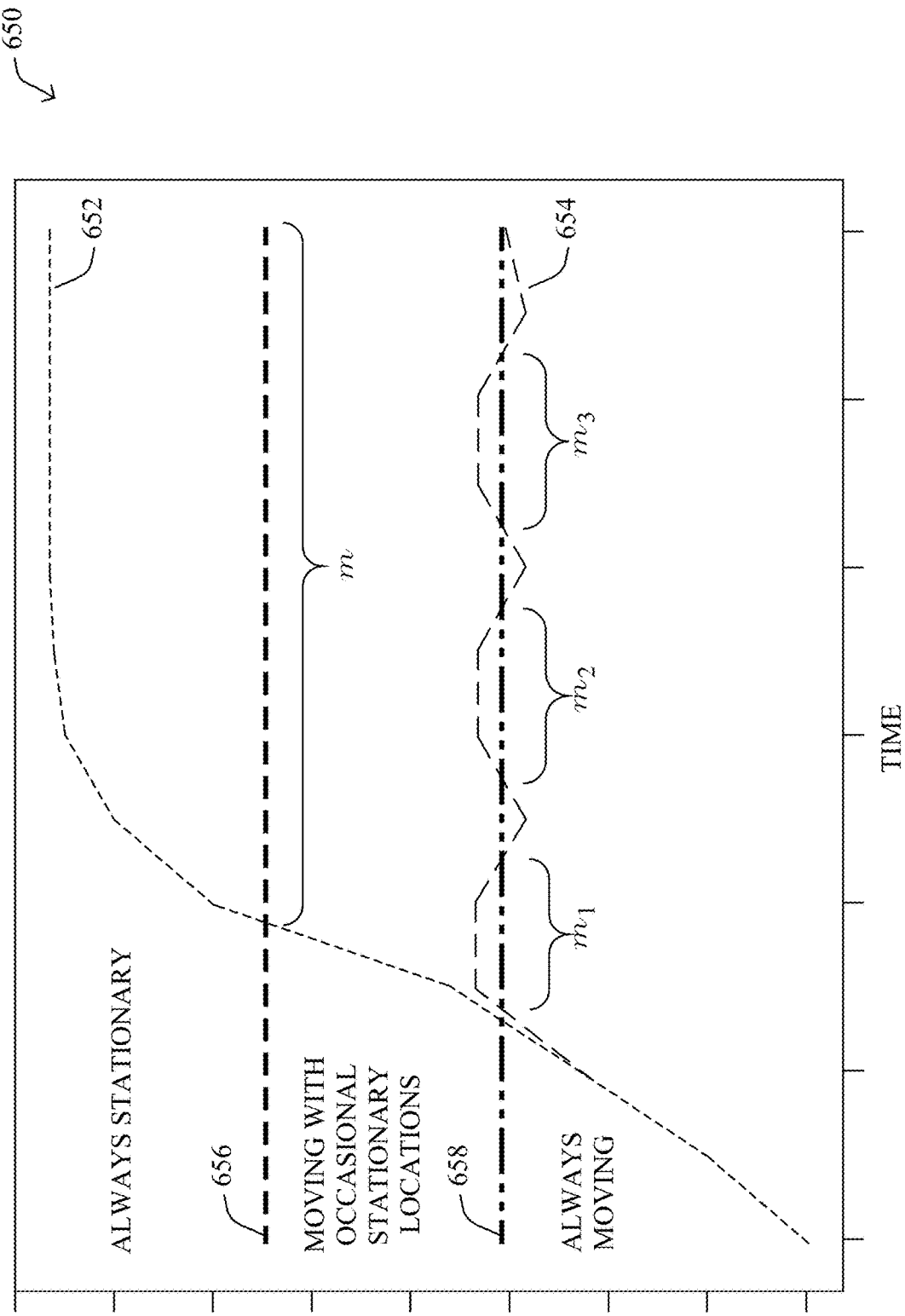

FIG. 6F illustrates another example plot 650 of the use of confidence factor thresholds, to characterize the movement behaviors of a node. As shown, if the confidence factor of a node is below a first threshold 658, this may indicate that the node is moving and may be categorized as such. For example, if the confidence factor of the node remains perpetually below threshold 658, it may be categorized as "always moving." As noted, however, this is a relatively rare case in most wireless network deployments. In much more common cases, the node may fluctuate between states of movement, with occasional stationary states. For example, consider the plot of is confidence factor 654, which crosses threshold 658 several times and dips back down. Accordingly, the node may be categorized as moving with occasional stationary locations during time periods $m_1$, $m_2$, and $m_3$, respectively.

Also as shown, a second, stricter threshold 656 can be employed, to further distinguish wireless nodes that are always stationary, in further embodiments. For example, consider the plot of confidence factor 652. Not only does confidence factor 652 cross threshold 658, but it also crosses the second threshold 656 and remains above this threshold (e.g., during the remaining time period m in plot 650). Thus, the node may be categorized as always stationary.

Figure 7A:
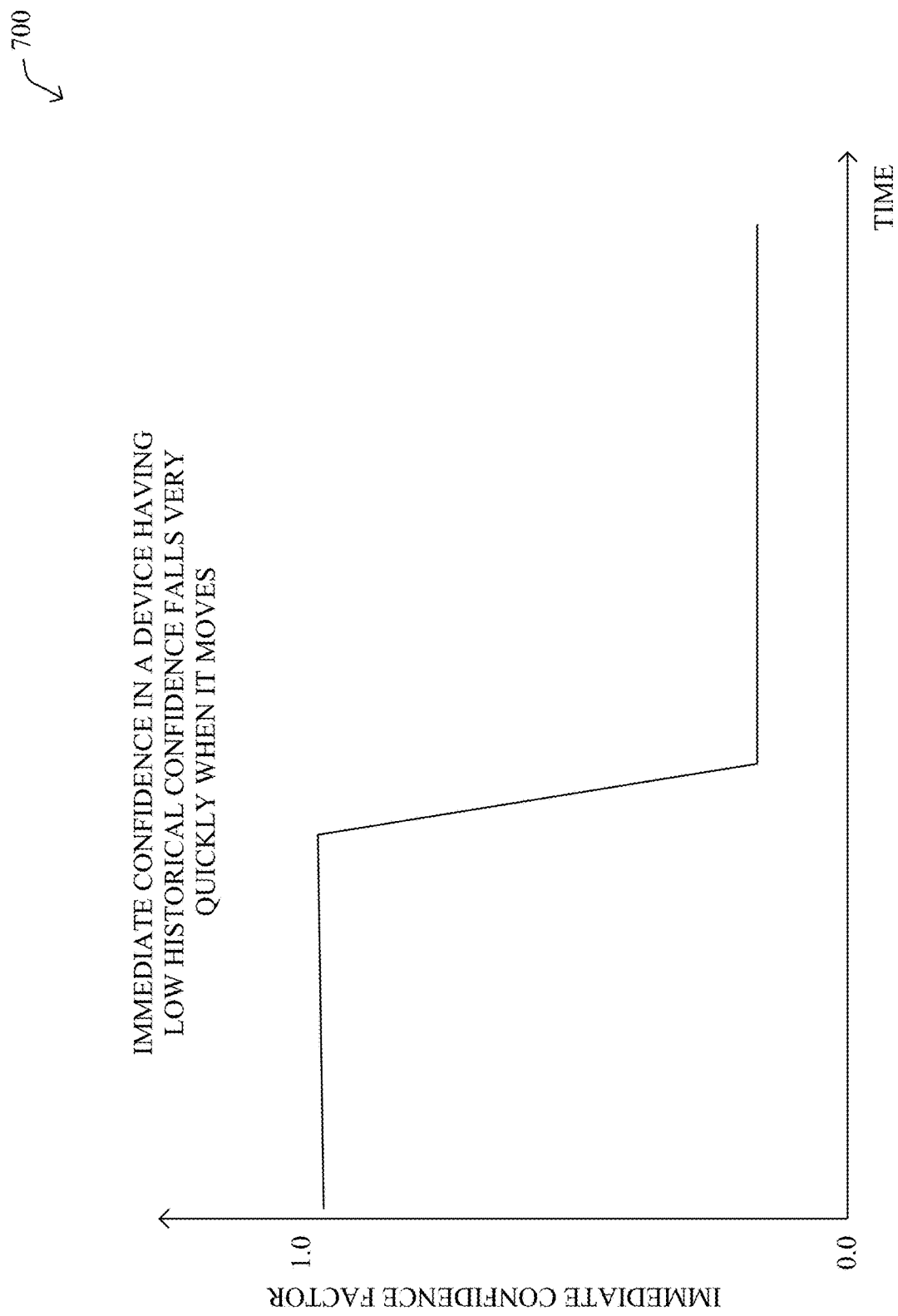
FIGS. 7A-7B illustrate example historical confidence factors for wireless nodes.
Figure 7B:
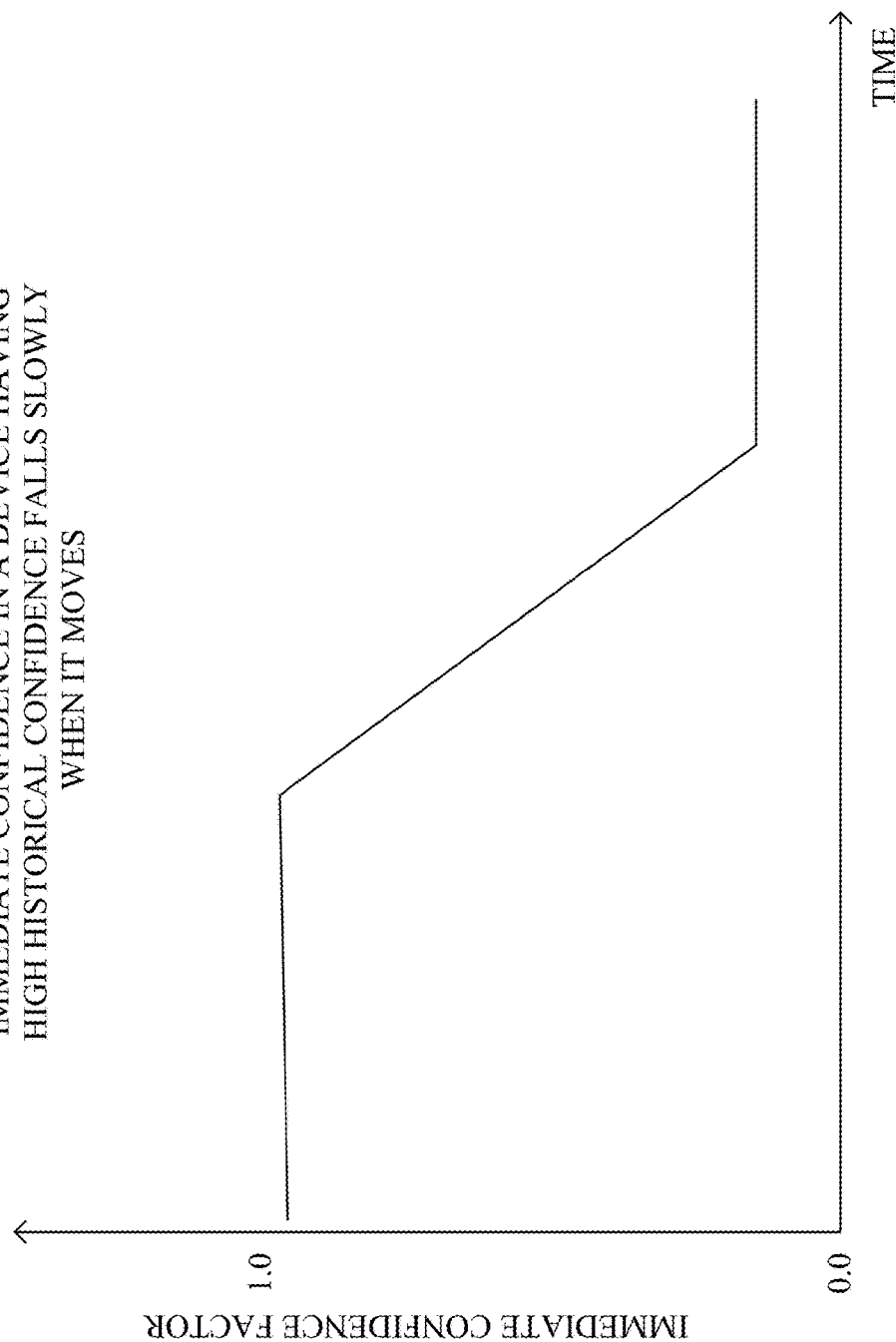

In some embodiments, the movement analysis system may also consider the historical confidence factor of a wireless node, which is a measure of the long-term stationarity of a device, when categorizing the movement of the wireless node. For example, FIGS. 7A-7B illustrate example confidence factors for different wireless nodes. FIG. 7A illustrates a plot 700 of the confidence factor of a node over time. Here, the confidence factor C can be represented by the equation C=m*t+b, where m is the slope of the plot. Likewise, FIG. 7B illustrates another plot 710 of the confidence factor of another wireless node. In comparing plots 700 and 710, two observations can be made. First, the immediate confidence factor of a device having a very low historical confidence factor falls very quickly when the node begins to move, as shown in FIG. 7A. Conversely, the immediate confidence factor of a device having a high confidence factor falls comparatively slowly when the node begins to move, as shown in FIG. 7B. Thus, the system can also leverage the historical confidence factor of a node, and the slope of its change over time, to evaluate the staticness of the node.

Referring again to FIG. 4, using DBSCAN, or another suitable clustering approach, hierarchical clustering module 402 may attempt to build clusters on a moving window of consecutive location estimates 412 produced by the IPS for a given wireless node. Then, using the techniques above, hierarchical clustering module 402 may evaluate the resulting cluster features (e.g., number of core, edge, and outlier points, core-edge ratio, etc.), to categorize the movement behavior of the wireless node. For example, is in various embodiments, hierarchical clustering module 402 may compare the confidence factor of the node to one or more thresholds, to identify points in time during which the node is stationary and its corresponding location(s).

A constructed prototype using the above approach was able to correctly distinguish between static and moving nodes in a training dataset 100% of the time. When the prototype formed a cluster, the centroid of the cluster was then calculated by taking the arithmetic mean of all points in the cluster. The zone in which the centroid sits was then assigned to the node as the stationary position of the node for that stationary period.

Note that it may also be the case that the determined stationary position of a node lies on the boundary between two zones. In such a case, in some embodiments, the system may employ the following tiebreaking approach:
1. Sort the list of location estimates in the stationary period by timestamp, in an ascending manner.
2. Partition the list in half, and proceed to the partition with the newer estimates. This ensures that more recent estimates are given greater consideration.
    If the length of the list is odd, put the odd element in the "old" partition.
3. Count how many elements in the partition are on each side of the boundary.
    If there is a majority, break the tie in favor of the winner.
    Otherwise, partition the list in half, and recursively repeat (3) until the tie is broken, or there is only one element left.
    If there is one element left, break the tie with that element. (This element should be the most recent estimate in the cluster).

Even if a device is making small movements within a zone during a stationary period, setting the clustering parameters appropriately should be enough to capture the stationary period.

In a further embodiment, hierarchical clustering module 402 may also take into account the fact that the location accuracy of the IPS may be different in different areas is of the floor. The intuition is that hierarchical clustering module 402 can use stricter thresholds for areas/zones in which the location estimates 412 are more accurate and less strict thresholds for areas/zones in which location estimates 412 are less accurate.

As shown, architecture 400 may also include sequence modeler 404 that takes as input the results of hierarchical clustering module 402. In general, sequence modeler 404 may assess the movement behaviors of occasionally moving wireless nodes, to determine the sequence of stationary positions/locations of the node during different periods of time. Indeed, many wireless nodes do move on occasion, but often remain static for certain periods of time. For example, such nodes may include mobile devices that are carried by humans from one location to another and locator tags that move with their corresponding objects from location to location. While these types of nodes do not qualify under the strict threshold so as to be considered always static, they still qualify under the less strict parameter threshold and form stationary position clusters. It is the function of sequence modeler 404 to learn the sequence of these stationary positions/locations of the node from the clusters formed by hierarchical clustering module 402.

By way of example, assume that the wireless node under scrutiny is a mobile phone that is carried by a shopper through a retail store. Over the course of several visits, the wireless network may collect raw data regarding the phone and the IPS of the network may estimate the locations of the phone over time. Through analysis of this data by hierarchical clustering module 402, movement analysis process 248 is able to identify stationary periods of time and locations of the phone, resulting in a dataset that appears in Table 1 as follows:

TABLE 1

| Stationary Position | Stationary Period Start | Stationary Period End |
| --- | --- | --- |
| Men's Clothing | 2018-08-26 13:00 | 2018-08-26 13:35 |
| Shoes | 2018-08-26 13:40 | 2018-08-26 13:55 |
| Hair Care | 2018-08-26 14:05 | 2018-08-26 14:20 |

TABLE 1-continued

| Stationary Position | Stationary Period Start | Stationary Period End |
| --- | --- | --- |
| Men's Clothing | 2018-09-04 15:30 | 2018-09-04 16:00 |
| Shoes | 2018-09-04 16:10 | 2018-09-04 16:50 |
| Hair Care | 2018-09-10 11:25 | 2018-09-10 11:40 |
| Men's Clothing | 2018-09-21 12:30 | 2018-09-21 13:30 |
| Shoes | 2018-09-21 13:50 | 2018-09-21 14:20 |
| Jewelry | 2018-09-21 14:30 | 2018-09-21 15:10 |

From the above data, sequence modeler 404 may assess the sequences of stationary positions/locations of the node, which aids in determining the behavioral profile of the node. For example, if sequence modeler 404 restricts its analysis to a single is visit, it may partition the dataset in Table 1 to stationary positions grouped by day. Then, for each group, sequence modeler 404 may affix a sentinel "Enter" stationary position to the head, and "Leave" stationary position to the tail of the list. In turn, sequence modeler 404 may output each modified group as a sequence. For example, doing so may result in the following sequences:
1) Enter→Men's Clothing→Shoes→Hair Care→Leave
2) Enter→Men's Clothing→Shoes→Leave
3) Enter→Hair Care→Leave
4) Enter→Men's Clothing→Shoes→Jewelry→Leave If the node left the building and returns later on in the same day, sequence modeler 404 may use a heuristic on the time difference between stationary positions, to determine whether this is indeed the case. If the time difference is large enough, sequence modeler 404 may split the data for a single day into two sequences, each beginning with "Enter" and ending with "Leave." Such heuristics can include, for example, simply taking the difference, and checking if it is greater than 3 hours or any other desired time span. This difference threshold can be adjusted based on the use case.

The collection of sequences generated by sequence modeler 404 from the stationary positions of a single node is referred to as the sequence dataset for the node. Once sequence modeler 404 has determined the sequence dataset for a node, movement is analysis process 248 may store the clustered learned by hierarchical clustering module 402 and the sequence dataset for that node as a node profile for the node. Such a profile may also include the location estimates 412 for the node, as well as the RF footprint data 410 for the node, such as its measured RSSI and AoA information. At times when the location clusters from clustering module 402 are weak, or location estimates 412 are too scattered (e.g., high variance and high bias), clustering module 402 may instead use RF footprint data 410 instead of, or together with, location estimates 412, to create the clusters.

In some embodiments, architecture 400 may also include a node-category profiler 406 configured to form profiles for different categories of nodes. Indeed, a wireless network deployment may contain thousands of wireless nodes, many of which serve a similar function. It would be cumbersome or repetitive to build a unique profile for each one, for purposes of anomaly detection and the like. In such cases, it is helpful to categorize similar nodes together, to generate a single profile for the category. At the very basic level, node-category profiler 406 may categorize the nodes by type, such as "tags," "mobile phones," "tablets," etc.

However, in further embodiments, node-category profiler 406 may instead apply context-specific labels to the nodes. For example, in a hospital setting, node-category profiler 406 may categorize wireless nodes according to their department of residence, such as "surgery," "pediatrics," or "radiology." Similarly, node-category profiler 406 may categorize wireless tracking tags according to what they are being used to track, such as "IV pumps" or "wheelchairs."

Figure 8B:
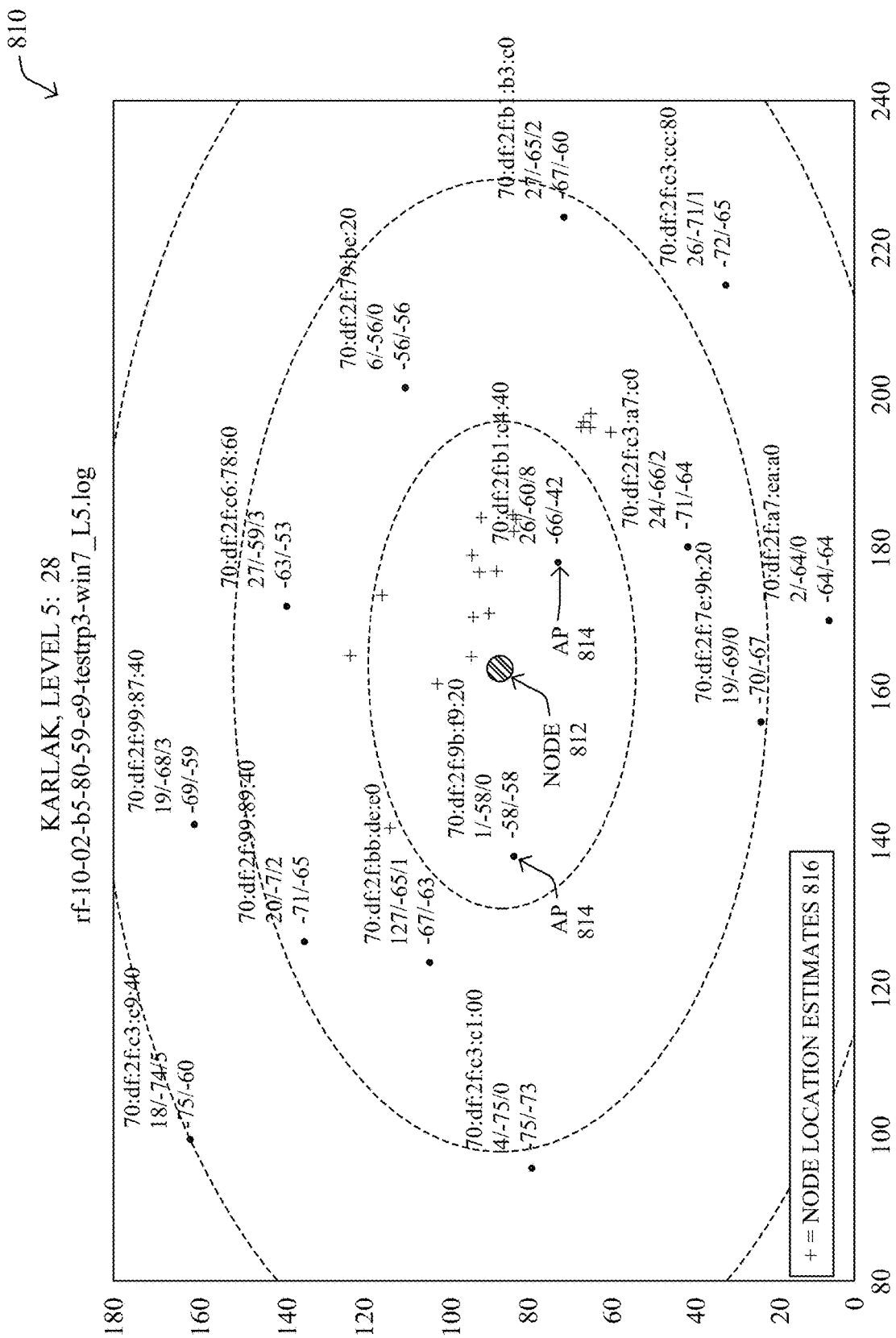

A further consideration that node-category profiler 406 may take into account when assigning nodes to node categories are the RF footprints of the nodes, in some embodiments. Notably, two devices that are at the same location may exhibit very different RF footprints, such as how often they chirp, how many APs hear them, which APs to which they connected and communicated, their transmit power (TxPower), etc. FIGS. 8A-8B illustrate examples of RF footprints of different devices at the same location. In FIG. 8A, plot 800 illustrates the APs and their associated RSSI metrics relative to a wireless node 802. Data for each AP shown has the following format: AP MAC address, # readings, median, standard deviation, minimum, maximum. For example, node 802 may have an RSSI with AP 804 shown that ranges between −57 and −45 dBm.

Plot 810 in FIG. 8B illustrates a similar RSSI plot for another wireless node 812 located in the same location as that of node 802 in FIG. 8A. Despite the two nodes being in the same physical location, they differ greatly, from an RF footprint standpoint. First, different APs hear them, as node 812 is able to also hear AP 814. Second, the APs that hear them exhibit different RSSI distributions. For example, the RSSI distributions for AP 804 differ greatly for nodes 802 and 812. Finally, the location estimates 806 and 816 for nodes 802 and 812, respectively, also differ. Intuitively, this makes sense, as the location estimates are based on the RSSI measurements and APs involved.

Referring again to FIG. 4, node-category profiler 406 may group nodes based on their generated profiles. For example, node-category profiler 406 may compare the sequence datasets, location estimations, and/or RF footprints of the nodes, to see how many patterns overlap. If that number is greater than a certain threshold (e.g., 25%), node-category profiler 406 may assign those nodes to the same category. In some embodiments, node-category profiler 406 may also generate an aggregate profile for any given node category that combines the profiles of its constituent nodes. For example, mobile devices that are mostly heard by the same set of APs on a specific floor are likely to be operated by co-workers and can be grouped together for purposes such as distributing facility services emergency alert or mailing lists.

According to various embodiments, a further component of movement analysis process 248 may be a profile matcher and predictor 408 configured to assess the sequences of the stationary locations from the profile of a node or, alternatively, from the profile of the node category to which the node belongs, to predict future movement is behaviors of the node as predictions 414. In various embodiments, profile matcher and predictor 408 may do so by generating/training a machine learning-based model using the modeled sequences of stationary positions. Such a model may be a Hidden Markov Model, an Long short-term memory (LSTM) based RNNs, or any other machine learning-based model suitable for sequence prediction. For example, profile matcher and predictor 408 may use a mining algorithm to extract out patterns such as the following as predictions 414:

Wheelchair Storage→Radiology Lab→Wheelchair Storage

Looking at the modeled sequential patterns above, it is clear that the node (e.g., a tracking tag attached to a wheelchair) typically travels between two locations: a wheelchair storage room and a radiology lab.

In various embodiments, predictions 414 generated by profile matcher and predictor 408 may be leveraged for purposes of anomaly detection in the network, either locally by movement analysis process 248 or by another security service. For example, from the above predictions, if the node is found to travel instead to a different location than that of the radiology lab or wheelchair storage room, this may indicate that the wheelchair has been inappropriately moved to another location. Predictions 414 by the predictive model of profile matcher and predictor 408 can also be used to detect anomalous behavior not tied to any particular node profile. As another example, suppose packages in a distribution center are being tracked using Wi-Fi tags with a high chirp rate (categorized as a single device-type). The model of profile matcher and predictor 408 may predict the rate of package movements from the storage to the loading area. However, if this rate drops below certain threshold, the system can detect the anomalous behavior and raise an alarm.

In further embodiments, predictions 414 can also be leveraged for purposes of better utilizing assets in a deployment. For example, if predictions 414 indicate that the wheelchair typically remains in storage at night, this information can be leveraged to instead reallocate the wheelchair to another department during this time.

In further embodiments, movement analysis process 248 can adjust the IPS mechanisms used to form location estimates 412, such as by using predictions 414 to adjust the estimated transmit power (TxPower) used to estimate the location of that node. For example, assume that a node is currently located on the border between two zones, such as radiology and cardiology. In such a case, its location estimate 412 may fall in either zone, depending on the parameters of the IPS. However, assume further that predictions 414 indicate that the node is predicted to be in radiology for some time. In such a case, this may indicate that the correct location of the node is radiology and the parameters of the IPS may be adjusted, accordingly.

Figure 9:
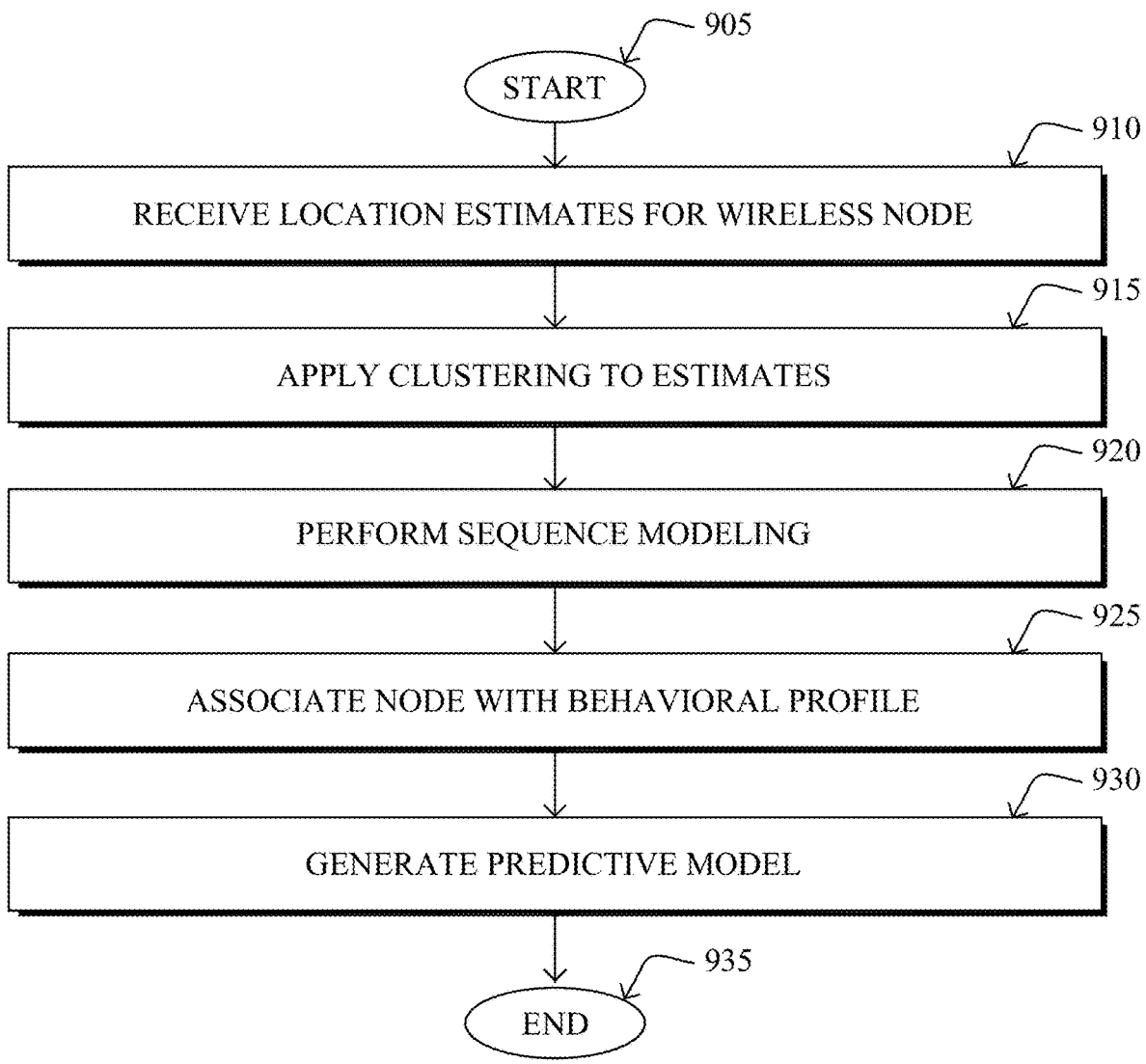
FIG. 9 illustrates an example simplified procedure for characterizing movement behaviors of a wireless node.

FIG. 9 illustrates an example simplified procedure for characterizing movement behaviors of a wireless node in a network in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above, the device may receive location estimates for a wireless node in a network, each location estimate having an associated timestamp. For example, the device may receive location estimates from an IPS or similar system within the wireless network. In addition to the location estimates, the device may also receive RF data regarding the node, such as RSSI information, AoA information, or the like.

At step 915, as detailed above, the device may apply hierarchical clustering to the received location estimates and their associated timestamps, to identify locations and points in time in which the wireless node was stationary. For example, if some of the location estimates for the node form a cluster, this may indicate that the node is stationary at a particular location for some time. Conversely, if the location estimates for the node do not form any clusters, this may indicate that the node is constantly moving from location to location.

At step 920, the device may perform sequence modeling on the identified locations and points in time in which the wireless node was stationary, as described in greater detail above. For example, the device may compute a confidence factor for the is wireless node based on its cluster information and compare the confidence factor to one or more thresholds. If the confidence factor for the node exceeds a first threshold, this may indicate that the node moves at least some of the time and is stationary some of the time. If the confidence factor exceeds a second, even stricter threshold, this may even indicate that the node is stationary in a single location all of the time.

At step 925, as detailed above, the device may associate the wireless node with a behavioral profile based on the sequence of locations and associated time periods in which the wireless node. Such a profile may generally indicate the sequence of locations at which the node was stationary and, in further cases, RF footprint information for the node at those locations. In some embodiments, the profile may even be a shared profile for a certain category of wireless nodes (e.g., tracking tags attached to a certain type of object on a floor, etc.).

At step 930, the device may generate, based in part on the behavioral profile for the wireless node, a predictive model that predicts a location of the wireless node at a particular point in time. In turn, predictions from the model can be used for purposes of detecting anomalies, applying location-based behavioral policies to the node (e.g., a tracking tag should never leave a certain area), or for any other purpose. Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for characterizing movement behaviors of nodes in a network, it is to be understood that various other adaptations and modifications may be made within the spirit and scope of the embodiments herein. For example, while certain embodiments are described herein with respect to using certain models for purposes of predicting node locations, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  receiving, at a device, location estimates for a wireless node in a network, each location estimate having an associated timestamp;
  applying, by the device, hierarchical clustering to the received location estimates and their associated timestamps, to identify locations and points in time in which the wireless node was stationary;
  performing, by the device, sequence modeling on the identified locations and points in time in which the wireless node was stationary, to form a sequence of locations and associated time periods in which the wireless node was stationary;
  receiving, at the device, radio frequency (RF) data for the wireless node;
  associating, by the device, the wireless node with a behavioral profile based on the sequence of locations and associated time periods in which the wireless node was stationary and the RF data; and
  generating, by the device and based in part on the behavioral profile for the wireless node, a predictive model that predicts a location of the wireless node at a particular point in time.

2. The method as in claim 1, wherein applying hierarchical clustering to the received location estimates and their associated timestamps, to identify locations and points in time in which the wireless node was stationary comprises:
  computing a confidence factor for a cluster formed by the applied hierarchical clustering as a sum of core and edge points in the cluster divided by location estimates for the wireless node in a given time period; and
  comparing the confidence factor for the cluster to a threshold, to determine whether the wireless node was stationary at a given location.

3. The method as in claim 1, further comprising:
  using, by the device, the predictive model to determine whether movement of the wireless node is anomalous.

4. The method as in claim 1, further comprising:
  associating, by the device, the wireless node with a category profile that has a context-specific label, based on measures of similarity between the behavioral profile of the wireless node and behavioral profiles of other wireless nodes.

5. The method as in claim 1, further comprising:
  applying, by the device, a location-based behavioral policy to the wireless node based on the behavioral profile of the wireless node.

6. The method as in claim 1, wherein the locations in which the wireless node was stationary are associated with labeled zones within a building.

7. The method as in claim 1, further comprising:
  initiating, by the device, an adjustment to an estimated transmit power used to compute the location estimates for the wireless node, based on the behavioral profile of the wireless node.

8. The method as in claim 1, wherein the device receives the location estimates from an indoor positioning system (IPS), the method further comprising:
  providing, by the device, an indication of the wireless node being stationary during a particular time period to the IPS, wherein the IPS uses the indication to delay computing a location estimate for the wireless node during the particular time period.

9. An apparatus comprising:
  one or more network interfaces to communicate with a network;
  a processor coupled to the network interfaces and configured to execute one or more processes; and
  a memory configured to store a process executable by the processor, the process when executed configured to:
    receive location estimates for a wireless node in a network, each location estimate having an associated timestamp;

apply hierarchical clustering to the received location estimates and their associated timestamps, to identify locations and points in time in which the wireless node was stationary;
perform sequence modeling on the identified locations and points in time in which the wireless node was stationary, to form a sequence of locations and associated time periods in which the wireless node was stationary;
associate the wireless node with a behavioral profile based on the sequence of locations and associated time periods in which the wireless node was stationary; and
generate, based in part on the behavioral profile for the wireless node, a predictive model that predicts a location of the wireless node at a particular point in time.

10. The apparatus as in claim 9, wherein the apparatus applies hierarchical clustering to the received location estimates and their associated timestamps, to identify locations and points in time in which the wireless node was stationary by:
computing a confidence factor for a cluster formed by the applied hierarchical clustering as a sum of core and edge points in the cluster divided by location estimates for the wireless node in a given time period; and
comparing the confidence factor for the cluster to a threshold, to determine whether the wireless node was stationary at a given location.

11. The apparatus as in claim 9, wherein the process when executed is further configured to:
use the predictive model to determine whether movement of the wireless node is anomalous.

12. The apparatus as in claim 9, wherein the process when executed is further configured to:
associate wireless node with a category profile that has a context-specific label, based on measures of similarity between the behavioral profile of the wireless node and behavioral profiles of other wireless nodes.

13. The apparatus as in claim 9, wherein the process when executed is further configured to:
receive radio frequency (RF) data for the wireless node, wherein the behavioral profile of the wireless node is based further on the received RF data.

14. The apparatus as in claim 9, wherein the process when executed is further configured to:
apply a location-based behavioral policy to the wireless node based on the behavioral profile of the wireless node.

15. The apparatus as in claim 9, wherein the locations in which the wireless node was stationary are associated with labeled zones within a building.

16. The apparatus as in claim 9, wherein the process when executed is further configured to:
initiate an adjustment to an estimated transmit power used to compute the location estimates for the wireless node, based on the behavioral profile of the wireless node.

17. The apparatus as in claim 9, wherein the device receives the location estimates from an indoor positioning system (IPS), wherein the process when executed is further configured to:
provide an indication of the wireless node being stationary during a particular time period to the IPS, wherein the IPS uses the indication to delay computing a location estimate for the wireless node during the particular time period.

18. A tangible, non-transitory, computer-readable medium storing program instructions that cause a device to execute a process comprising:
receiving, at the device, location estimates for a wireless node in a network, each location estimate having an associated timestamp;
applying, by the device, hierarchical clustering to the received location estimates and their associated timestamps, to identify locations and points in time in which the wireless node was stationary;
performing, by the device, sequence modeling on the identified locations and points in time in which the wireless node was stationary, to form a sequence of locations and associated time periods in which the wireless node was stationary;
associating, by the device, the wireless node with a behavioral profile based on the sequence of locations and associated time periods in which the wireless node was stationary; and
generating, by the device and based in part on the behavioral profile for the wireless node, a predictive model that predicts a location of the wireless node at a particular point in time.

19. The computer-readable medium as in claim 18, wherein applying hierarchical clustering to the received location estimates and their associated timestamps, to identify locations and points in time in which the wireless node was stationary comprises:
computing a confidence factor for a cluster formed by the applied hierarchical clustering as a sum of core and edge points in the cluster divided by location estimates for the wireless node in a given time period; and
comparing the confidence factor for the cluster to a threshold, to determine whether the wireless node was stationary at a given location.

* * * * *

UNITED STATES PATENT AND TRADEMARK OFFICE
CERTIFICATE OF CORRECTION

PATENT NO. : 10,542,517 B1
APPLICATION NO. : 16/539359
DATED : January 21, 2020
INVENTOR(S) : Abhishek Mukherji et al.

It is certified that error appears in the above-identified patent and that said Letters Patent is hereby corrected as shown below:

In the Specification

In Column 1, Line 63, please amend as shown:
izing movement behaviors of wireless nodes in a network;

In Column 3, Line 3, please amend as shown:
sensors, each sensor device (node) in a sensor network In Column 3, Line 45, please amend as shown:
shown in network 100 may support a given customer site, In Column 4, Line 17, please amend as shown:
ferent types of local networks. For example, network 100

In Column 5, Line 34, please amend as shown:
interconnected by a system bus 250, as well as a power In Column 7, Line 25, please amend as shown:
setting their control parameters (e.g., max number of In Column 9, Line 14, please amend as shown:
associated time periods in which the wireless node. The In Column 10, Line 27, please amend as shown:
In order to localize such nodes without the aid of any In Column 11, Line 40, please amend as shown:
strict criteria) or "stationary for a time period" (less strict)

Signed and Sealed this
Eleventh Day of August, 2020

Andrei Iancu
*Director of the United States Patent and Trademark Office*

In Column 12, Line 12, please amend as shown:
consider the plot of confidence factor 654, which crosses In Column 12, Line 53, please amend as shown:
behavior of the wireless note. For example in various In Column 13, Line 26, please amend as shown:
accuracy of the IPS may be different in different areas of In Column 14, Line 15, please amend as shown:
to a single visit, it may partition the dataset in Table 1 to In Column 14, Line 40, please amend as shown:
for a node, movement analysis process 248 may store the In Column 15, Line 49, please amend as shown:
node belongs, to predict future movement behaviors of the In the Claims In Column 16, Line 65, please amend as shown:
factor for the wireless node based on its cluster informa-